(12) United States Patent
Han et al.

(10) Patent No.: US 12,187,633 B2
(45) Date of Patent: Jan. 7, 2025

(54) INTELLIGENT EARLY WARNING METHOD OF MEMBRANE FOULING

(71) Applicant: BEIJING UNIVERSITY OF TECHNOLOGY, Beijing (CN)

(72) Inventors: Hong-Gui Han, Beijing (CN); Ying-Xu Wang, Beijing (CN); Shu-Jun Wu, Beijing (CN); Min Guo, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 649 days.

(21) Appl. No.: 16/551,297

(22) Filed: Aug. 26, 2019

(65) Prior Publication Data
US 2020/0071209 A1 Mar. 5, 2020

(30) Foreign Application Priority Data
Aug. 29, 2018 (CN) .......................... 201810995136.9

(51) Int. Cl.
C02F 3/00 (2023.01)
B01D 65/08 (2006.01)
C02F 3/12 (2023.01)
G01N 17/00 (2006.01)

(52) U.S. Cl.
CPC .............. *C02F 3/006* (2013.01); *B01D 65/08* (2013.01); *C02F 3/1268* (2013.01); *G01N 17/008* (2013.01); *C02F 2209/006* (2013.01); *C02F 2209/03* (2013.01); *C02F 2209/04* (2013.01); *C02F 2209/06* (2013.01); *C02F 2209/08* (2013.01); *C02F 2209/15* (2013.01); *C02F 2209/22* (2013.01); *C02F 2209/40* (2013.01)

(58) Field of Classification Search
CPC ........ C02F 3/006; C02F 3/1268; B01D 65/08; G01N 17/008; G01N 33/18; G01N 33/1806; G01N 33/188

USPC ................................................ 702/25; 706/21
See application file for complete search history.

(56) References Cited

U.S. PATENT DOCUMENTS

2011/0035195 A1* 2/2011 Subbiah .................... C02F 1/44
703/2
2015/0034553 A1* 2/2015 Kumar ...................... C02F 3/30
210/85

FOREIGN PATENT DOCUMENTS

CN 103744293 A * 4/2014

OTHER PUBLICATIONS

Xu et al., CN 103744293A English Machine Translation, pp. 1-4 (Year: 2014).*

* cited by examiner

Primary Examiner — Claire A Norris
(74) Attorney, Agent, or Firm — J.C. PATENTS

(57) ABSTRACT

To solve problems of frequent occurrence and great harm of membrane fouling during MBR wastewater treatment process, the invention proposes a membrane fouling intelligent early warning method to realize online and accurate early warning of membrane fouling. This early warning method achieves accurate prediction of water permeability by constructing soft-computing model based on recurrent fuzzy neural network. The intelligent early warning of membrane fouling is achieved by the comprehensive evaluation method, which solves the problem that membrane fouling is difficult to be early warning in the MBR wastewater treatment process, improves the pretreatment ability of membrane fouling, reduces the damage caused by membrane fouling, ensures the safe operation of MBR wastewater treatment process, and promotes efficient and stable operation of MBR wastewater treatment plant.

1 Claim, 6 Drawing Sheets

INTELLIGENT EARLY WARNING METHOD OF MEMBRANE FOULING

CROSS-REFERENCE TO RELATED APPLICATION

This application claims the priority benefit of Chinese application serial no. 201810995136.9, filed Aug. 29, 2018. All disclosure of the China application is incorporated herein by reference.

TECHNOLOGY AREA

The invention belongs to the field of on-line detection of water quality parameters in the wastewater treatment process, and constructs the intelligent early warning method for membrane bioreactor-MBR membrane pollution for the first time.

Based on the actual operation data of MBR membrane wastewater treatment process, the characteristic variables of MBR membrane water permeability are extracted by feature analysis method, and the soft-computing model was established by recurrent fuzzy neural network to predict the permeability which is difficult to directly measure in MBR wastewater treatment process. A comprehensive evaluation model about membrane fouling level is established based on the predicted value of water permeability and other process variables that can be collected acquire in the wastewater treatment plant to obtain the pollution status of the membrane, achieve the intelligent early warning of membrane fouling, and improve the effluent quality and service life of the membrane.

TECHNOLOGY BACKGROUND

In 2017, the "State of the Environment" issued by the Ministry of Environmental Protection pointed out that in 2016, the discharge of urban wastewater in the country was 51.03 billion tons; affecting people's health, production and life seriously. Therefore, the reuse of wastewater treatment, full protection of the water environment, and the recycling and reuse of existing freshwater resources are the guidelines for the comprehensive utilization of water resources formulated by the Chinese government. MBR is one of the wastewater recycling and utilization technologies that is vigorously promoted by the state. "The thirteenth Five-Year Plan" proposes the goal of China's development of the membrane industry is that the average annual growth rate of the membrane industry's total output value is 20% or more, and it is predicted to reach 200-250 billion yuan by 2020. From 2011 to the present, through the comprehensive promotion of membrane treatment wastewater technology, our country has built and used hundreds of 10,000-ton MBR wastewater treatment plants. In the national development plan, it is proposed to study and promote low-energy and high-efficiency wastewater treatment technology. MBR membrane wastewater treatment technology as a new type of wastewater treatment technology has broad application prospects, therefore, the invention has great research significance and application value.

The MBR wastewater treatment process solves the application defects of the traditional activated sludge treatment technology and raises the wastewater regeneration treatment technology to a new level. However, membrane fouling is unavoidable in MBR wastewater treatment process. Membrane fouling not only increases the amount of aeration and the obstacle of water, but also results in high operating energy consumption and greatly complicates operations. Therefore, according to the pollution state of membrane, it is necessary to realize real-time and objective cleaning or replacement of the membrane module before the contamination state of the membrane reaches a certain level. However, the characteristics of treating wastewater using MBR are multiple processes, time-varying, and uncertain. It is a non-stationary system that is difficult to model directly, and the monitoring of pollution status is a difficult problem in the current self-control field. At present, the membrane wastewater treatment plant that has been completed and put into operation has no effective monitoring and early warning system to realize the intelligent early warning of membrane wastewater treatment process. Therefore, new early warning technology is studied to solve the problem of membrane fouling in wastewater treatment process which has become an important topic in the field of wastewater control, and has important practical significance.

The invention relates to a membrane bioreactor-MBR membrane fouling intelligent early warning method, which uses feature analysis method to extract characteristic variables and establishes a soft-computing model of membrane permeability based on recurrent neural network, which can realize the accurate prediction of water permeability in the membrane wastewater treatment process. A comprehensive evaluation model of membrane fouling level is established by using the predicted value of water permeability combining with other process variables that can be acquired in wastewater treatment plant. However, the intelligent early warning system for membrane fouling at home and abroad has not yet formed a complete theoretical system. Based on intelligence methods, MBR membrane fouling intelligent early warning method including software and hardware platforms was built, which has high development and application value in filling domestic and foreign technology gaps and integrating wastewater treatment industry chain.

SUMMARY

1. Membrane bioreactor-MBR membrane fouling intelligent early warning method, including data acquisition of the running process, data pretreatment of the running process, intelligent prediction of membrane fouling, and intelligent early warning of membrane fouling, comprising the following steps:

(1) Data acquisition of the running process: data are collected by the acquisition instrument installed on the process site, including: water flow, water pressure, chemical oxygen demand, pH, biological oxygen demand, total phosphorus, oxidation-reduction potential in anaerobic zone, oxidation-reduction potential ORP in anoxic zone, dissolved oxygen in aerobic zone, nitrate in aerobic zone, aeration; the acquired data is transmitted to the Programmable Logic Controller through Modbus communication protocol, and Programmable Logic Controller transmits the process data to the host computer through RS232 communication protocol; the data in the host computer is transmitted to the data processing server through the local area network; the process data is displayed to the management personnel in wastewater treatment plant through the Web server by the way of the Browser/Server, and the results of water permeability prediction and the membrane fouling early warning are displayed by the way of Client/Server;

(2) Data pretreatment of the running process: taking the membrane pool operation data as the research object, the characteristic analysis model is established by partial least squares method to extract five principal component variables, which are water flow, water pressure, aeration, ORP in anaerobic zone and nitrate in aerobic zone; these five principal component variables as input variables of the membrane fouling intelligent prediction model, and water permeability as the output variable of the membrane fouling intelligent prediction model;

(3) Intelligent prediction of membrane fouling: establish soft-computing model to achieve water permeability prediction based on recurrent fuzzy neural network, the structure of recurrent fuzzy neural network contains four layers: input layer, membership function layer, normalized layer and output layer, the network is 5-M-M-1, M is an integer and 2<M<30; connecting weights between input layer and membership function layer are assigned 1, the output of recurrent fuzzy neural network is y(t); the prediction method of water permeability based on recurrent fuzzy neural network is:

$$y(t) = \quad (1)$$
$$f(x(t)) = \sum_{j=1}^{M} w_j(t) \prod_{i=1}^{5} \exp\left[-\frac{[\beta_{ij}(t)x_i(t) + \theta_{ij}(t)O_{ij}^2(t-1) - m_{ij}(t)]^2}{(\sigma_{ij}(t))^2}\right],$$

where $x(t)=[x_1(t), x_2(t), x_3(t), x_4(t), x_5(t)]$ the output vector at time t, $x_1(t)$ is the value of water flow, $x_2(t)$ is the value of water pressure, $x_3(t)$ is the value of aeration, $x_4(t)$ is the value of ORP in anoxic zone, and $x_5(t)$ is the value of nitrate in aerobic zone, f is the corresponding relation between y(t) and x(t), $w_j(t)$ is the jth weight between normalized layer and output layer, $\beta_{ij}(t)=1$ is the weight between the ith neuron in input layer and the jth neuron in membership function layer, $m_{ij}(t)$ is the ith element of the center values of the jth neuron in the membership function layer and $\sigma_{ij}(t)$ is the ith element of width values of the jth neuron in the membership function layer, $\theta_{ij}(t)$ is the feedback weight in the membership function layer, $O_{ij}^2(t-1)$ is the feedback value of the membership function layer, where $$O_{ij}^2(t-1) = \exp\{-[\beta_{ij}(t-1)x_i(t-1) - \theta_{ij}(t-1)O_{ij}^2(t-2) - m_{ij}(t-1)]^2/(\sigma_{ij}(t-1))^2\}, \quad (2)$$

where $\beta_{ij}(t-1)=1$ is the weight between the ith neuron in input layer and the jth neuron in membership function layer, $m_{ij}(t-1)$ is the ith element of the center values of the jth neuron in the membership function layer and $\sigma_{ij}(t-1)$ is the ith element of width values of the jth neuron in the membership function layer, $\theta_{ij}(t-1)$ is the feedback weight in the membership function layer at time, $O^2_{ij}(t-2)$ is the feedback value of the membership function layer; the error of recurrent fuzzy neural network is:

$$E(t) = \frac{1}{N}\sum_{i=1}^{N}(y_d(t) - y(t))^2, \quad (3)$$

where N is the number of samples, $y_d(t)$ is the output of recurrent fuzzy neural network at time t, y(t) is the actual output at time t, the model is trained as:

1) Give a recurrent fuzzy neural network, the initial number of neurons in membership function layer and normalized layer are M, M>2 is a positive integer; the input of recurrent fuzzy neural network is x(1), x(2), ..., x(t), x(N), correspondingly, the output is $y_d(1), y_d(2), \ldots, y_d(t), \ldots, y_d(N)$, the number of training samples is N, expected error value is set to $E_d$, $E_d \in (0, 0.01]$, the assignment interval of each variable in the initial center values $m_j(1)$ is [−2, 2], $m_j(1)=(m_{1j}(1), m_{2j}(1), \ldots, m_{ij}(1))$, $m_{ij}(1)$ is the initial value of the ith element of the center values of the jth neuron in the membership function layer, the assignment interval of each variable in the initial width values $\sigma_j(1)$ is [0,1], $\sigma_j(1)=(\sigma_{1j}(1), \sigma_{2j}(1), \ldots, \sigma_{ij}(1))$, $\sigma_{ij}(1)$ is the initial value of the ith element of width values of the jth neuron in the membership function layer, $\theta_{ij}(t-1)$ is the feedback weight in the membership function layer at time t−1, the assignment interval of the initial feedback connection weight $\theta_{ij}(1)$ is [0, 1], j=1, 2, . . . , M; the assignment interval of each variable in the initial weights w(1) is [−1, 1], $w(1)=(w_1(1), w_2(1), \ldots, w_j(1))$, $w_j(1)$ is the connection weight between the jth neuron of normalized layer and the output layer at the initial time;

2) Set the learning step s=1;
3) Calculate the output y(t) of recurrent fuzzy neural network according to Eq. (1), exploiting gradient descent algorithm:

$$m_{ij}(t+1) = m_{ij}(t) - \eta_m \frac{1}{\sigma_{ij}^2(t)}(y_d(t) - y(t))w_j(t)O_{ij}(t)[O_{ij}(t) - m_{ij}(t)], \quad (4)$$

$$\sigma_{ij}(t+1) = \sigma_{ij}(t) - \eta_\sigma \frac{1}{\sigma_{ij}^3(t)}(y_d(t) - y(t))w_j(t)O_{ij}(t)\|O_{ij}(t) - m_{ij}(t)\|^2, \quad (5)$$

$$\theta_{ij}(t+1) = \theta_{ij}(t) - \eta_\theta(y_d(t) - y(t))w_j(t)O_{ij}(t)y(t-1), \quad (6)$$

$$w_j(t+1) = w_j(t) - \eta_w(y_d(t) - y(t))O_{ij}(t), \quad (7)$$

where $\eta_m$ is the learning rate of the center $m_{ij}$, $\eta_m \in (0, 0.01]$, $\eta_\sigma$ is the learning rate of the width $\sigma_j$, $\eta_\sigma \in (0, 0.1]$, $\eta_\theta$ is the learning rate of the feedback connection weight $\theta_{ij}$, $\eta_\theta \in (0, 0.02]$, $\eta_w$ is the learning rate of the connection weight $w_j$, $\eta_w \in (0, 0.01]$, $m_{ij}(t+1)$ is the ith element of the center values of the jth neuron in the membership function layer at time t+1 and $\sigma_{ij}(t+1)$ is the ith element of width values of the jth neuron in the membership function layer at time t+1, $\theta_{ij}(t+1)$ is the feedback weight in the membership function layer at time t+1, $w_j(t+1)$ is the connection weight between the jth neuron of normalized layer and the output layer at time t+1;

4) Calculate the performance of recurrent fuzzy neural network according to Eq. (3), if E(t)≥$E_d$, go to step 3); if E(t)<$E_d$, stop the training process;

(4) Intelligent early warning of membrane fouling: establish a comprehensive evaluation model of membrane fouling level based on the predicted values of water permeability combining with other process variables, which is specifically as follows:

1) Determine the warning evaluation index of membrane fouling, set $U(t)=\{u_1(t), u_2(t), u_3(t), y(t)\}$ as the evaluation indicator vector, $u_1(t), u_2(t)$, and $u_3(t)$ represent the values of water flow, water pressure and aeration, y(t) is the predicted values of permeability;

2) Establish the membership functions and fuzzy comprehensive assessment matrix, membership functions reflect the relationships between the quality measurements and the defined risk levels, the membership of the evaluation factor is obtained by bringing the measured values into the membership function, the membership degree matrix R(t) can be represented as $$R(t) = (r_{ij}(t))_{4\times 4} = \begin{pmatrix} r_{11}(t) & r_{12}(t) & r_{13}(t) & r_{14}(t) \\ r_{21}(t) & r_{22}(t) & r_{23}(t) & r_{24}(t) \\ r_{31}(t) & r_{32}(t) & r_{33}(t) & r_{34}(t) \\ r_{41}(t) & r_{42}(t) & r_{43}(t) & r_{44}(t) \end{pmatrix}, \quad (8)$$

where $r_{ij}(t)$ (i=1, 2, ..., 4; j=1, 2, ..., 4) indicates the membership degree of the ith index and the corresponding jth risk rank; the membership degrees of water flow in different risk rank are $$r_{11}(t) = \begin{cases} 1, u_1(t) \le 200 \\ (300 - u_1(t))/100, 200 < u_1(t) \le 300, \\ 0, u_1(t) > 300 \end{cases} \quad (9)$$

$$r_{12}(t) = \begin{cases} 0, u_1(t) \le 200, u_1(t) > 460 \\ (u_1(t) - 200)/100, 200 < u_1(t) \le 300, \\ (460 - u_1(t))/160, 300 < u_1(t) \le 460 \end{cases} \quad (10)$$

$$r_{13}(t) = \begin{cases} 0, u_1(t) \le 300, u_1(t) > 1000 \\ (u_1(t) - 300)/160, 300 < u_1(t) \le 460, \\ (1000 - u_1(t))/540, 460 < u_1(t) \le 1000 \end{cases} \quad (11)$$

$$r_{14}(t) = \begin{cases} 0, u_1(t) < 460 \\ (u_1(t) - 460)/540, 460 \le u_1(t) \le 1000, \\ 1, u_1(t) > 1000 \end{cases} \quad (12)$$

The membership degrees of water pressure in different risk rank are $$r_{21}(t) = \begin{cases} 1, u_2(t) \le 5 \\ (10 - u_2(t))/5, 5 < u_2(t) \le 10, \\ 0, u_2(t) > 10 \end{cases} \quad (13)$$

$$r_{22}(t) = \begin{cases} 0, u_2(t) \le 5, u_2(t) > 15 \\ (u_2(t) - 5)/5, 5 < u_2(t) \le 10, \\ (15 - u_2(t))/5, 10 < u_2(t) \le 15 \end{cases} \quad (14)$$

$$r_{23}(t) = \begin{cases} 0, u_2(t) \le 10, u_2(t) > 20 \\ (u_2(t) - 10)/5, 10 < u_2(t) \le 15, \\ (20 - u_2(t))/5, 15 < u_2(t) \le 20 \end{cases} \quad (15)$$

$$r_{24}(t) = \begin{cases} 0, u_2(t) < 15 \\ (u_2(t) - 15)/5, 15 \le u_2(t) \le 20, \\ 1 \; u_2(t) > 20 \end{cases} \quad (16)$$

The membership degrees of aeration in different risk rank are $$r_{31}(t) = \begin{cases} 1, u_3(t) \le 15 \\ (20 - u_3(t))/5, 15 < u_3(t) \le 20, \\ 0, u_3(t) > 20 \end{cases} \quad (17)$$

$$r_{32}(t) = \begin{cases} 0, u_3(t) \le 15, u_3(t) > 30 \\ (u_3(t) - 15)/5, 15 < u_3(t) \le 20, \\ (30 - u_3(t))/10, 20 < u_3(t) \le 30 \end{cases} \quad (18)$$

$$r_{33}(t) = \begin{cases} 0, u_3(t) \le 20, u_3(t) > 50 \\ (u_3(t) - 20)/10, 20 < u_3(t) \le 30, \\ (50 - u_3(t))/20, 30 < u_3(t) \le 50 \end{cases} \quad (19)$$

$$r_{34}(t) = \begin{cases} 0, u_3(t) < 30 \\ (u_3(t) - 30)/20, 30 \le u_3(t) \le 50, \\ 1, u_3(t) > 50 \end{cases} \quad (20)$$

The membership degrees of water permeability in different risk rank are $$r_{41}(t) = \begin{cases} 1, y(t) \le 30 \\ (60 - y(t))/30, 30 < y(t) \le 60, \\ 0, y(t) > 60 \end{cases} \quad (21)$$

$$r_{42}(t) = \begin{cases} 0, y(t) \le 30, y(t) > 80 \\ (y(t) - 30)/30, 30 < y(t) \le 60, \\ (80 - y(t))/20, 60 < y(t) \le 80 \end{cases} \quad (22)$$

$$r_{43}(t) = \begin{cases} 0, y(t) \le 60, y(t) > 200 \\ (y(t) - 60)/20, 60 < y(t) \le 80, \\ (80 - y(t))/120, 80 < y(t) \le 200 \end{cases} \quad (23)$$

$$r_{44}(t) = \begin{cases} 0, y(t) < 80 \\ (y(t) - 80)/120, 80 \le y(t) \le 200, \\ 1, y(t) > 200 \end{cases} \quad (24)$$

3) Determine the pollution levels, suppose $B(t)=[b_1(t), b_2(t), b_3(t), b_4(t)]$ is the possibility vector of matrix R(t), $\eta(t)=[\eta_1(t), \eta_2(t), \eta_3(t), \eta_4(t)]$ is the weight vector of matrix R(t); the relation between $b_j(t)$ and $\eta_j(t)$ is $$b_j(t)=r_{1j}(t)\eta_1(t)+r_{2j}(t)\eta_2(t)+r_{3j}(t)\eta_3(t)+r_{4j}(t)\eta_4(t), \quad (25)$$

$$B(t)=R(t)\eta(t), \quad (26)$$

where $b_j(t)$, j=1,2,3,4, reflects the possibility of the jth risk rank, B(t) can reflect the contribution degree of different risk ranks; then, it will be $$B(t)=\lambda(t)\eta(t), \quad (27)$$

$$\lambda_{max}(t)=\max \lambda(t), \quad (28)$$

where $\lambda(t)$ is the ratio coefficient vector between B(t) and $\eta(t)$; the maximum ratio coefficient is given as $\lambda_{max}(t)$, which is the maximum eigenvalue of R(t); according to the matrix theory, the column ordinal of largest eigenvalue could be considered as the corresponding risk rank;

Membrane pollution intelligent early warning method consists of process data acquisition and pretreatment, membrane pollution intelligent prediction and early warning; the process data are collected by the acquisition instrument installed on the process site; five principal component variables is extracted by the characteristic analysis model based on partial least squares method; the soft-computing model based on recurrent fuzzy neural network is established to achieve water permeability prediction; the level of membrane fouling is evaluated by establishing a comprehensive evaluation model; the results of water permeability prediction and membrane fouling early warning are displayed in the interface of an early warning system to guide the operation of water plant, which can improve the efficiency and economic benefits of MBR wastewater treatment process.

Figure 1:
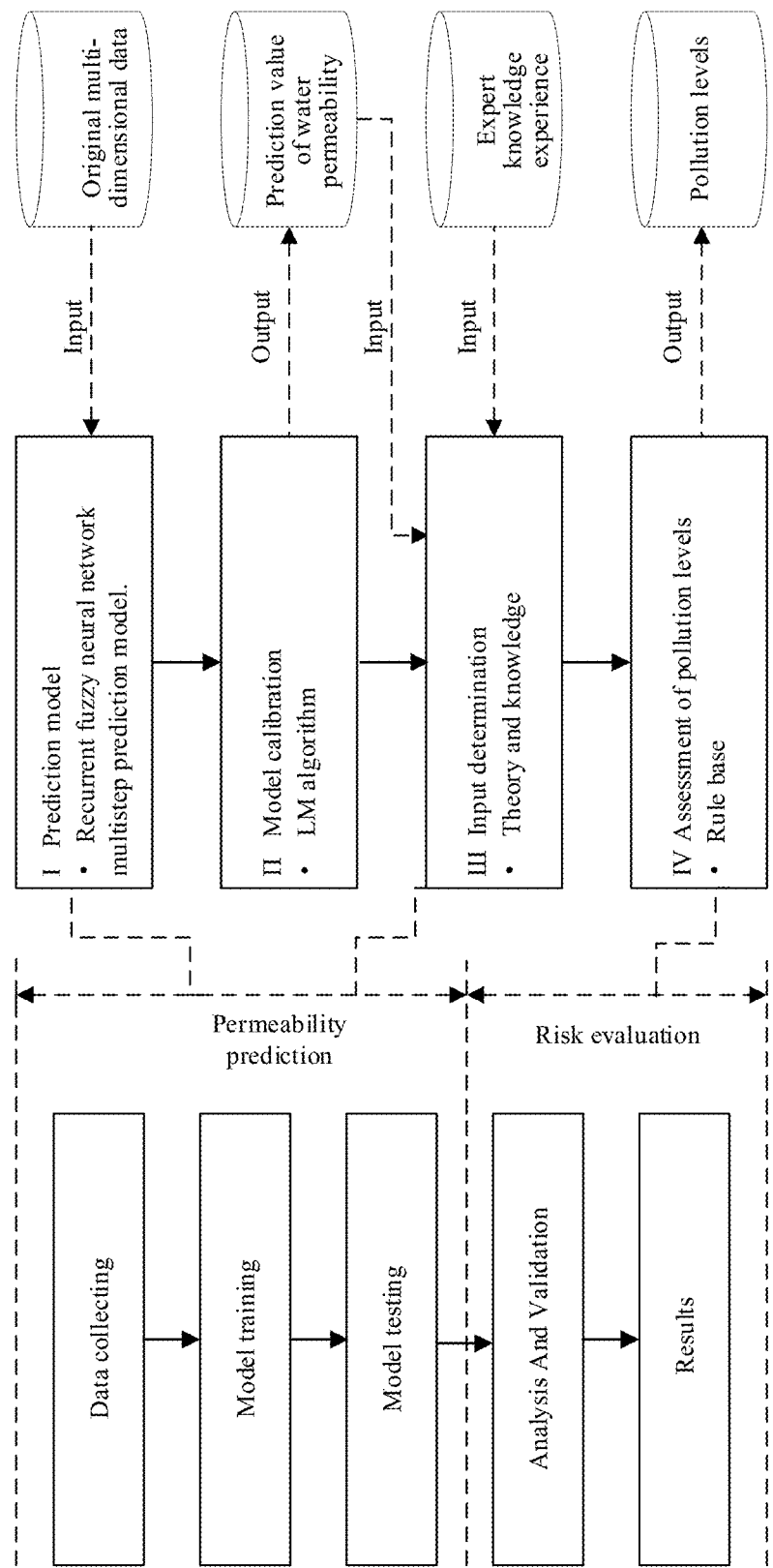
FIG. 1 is the overall structure of membrane pollution intelligent early warning system.
Figure 2:
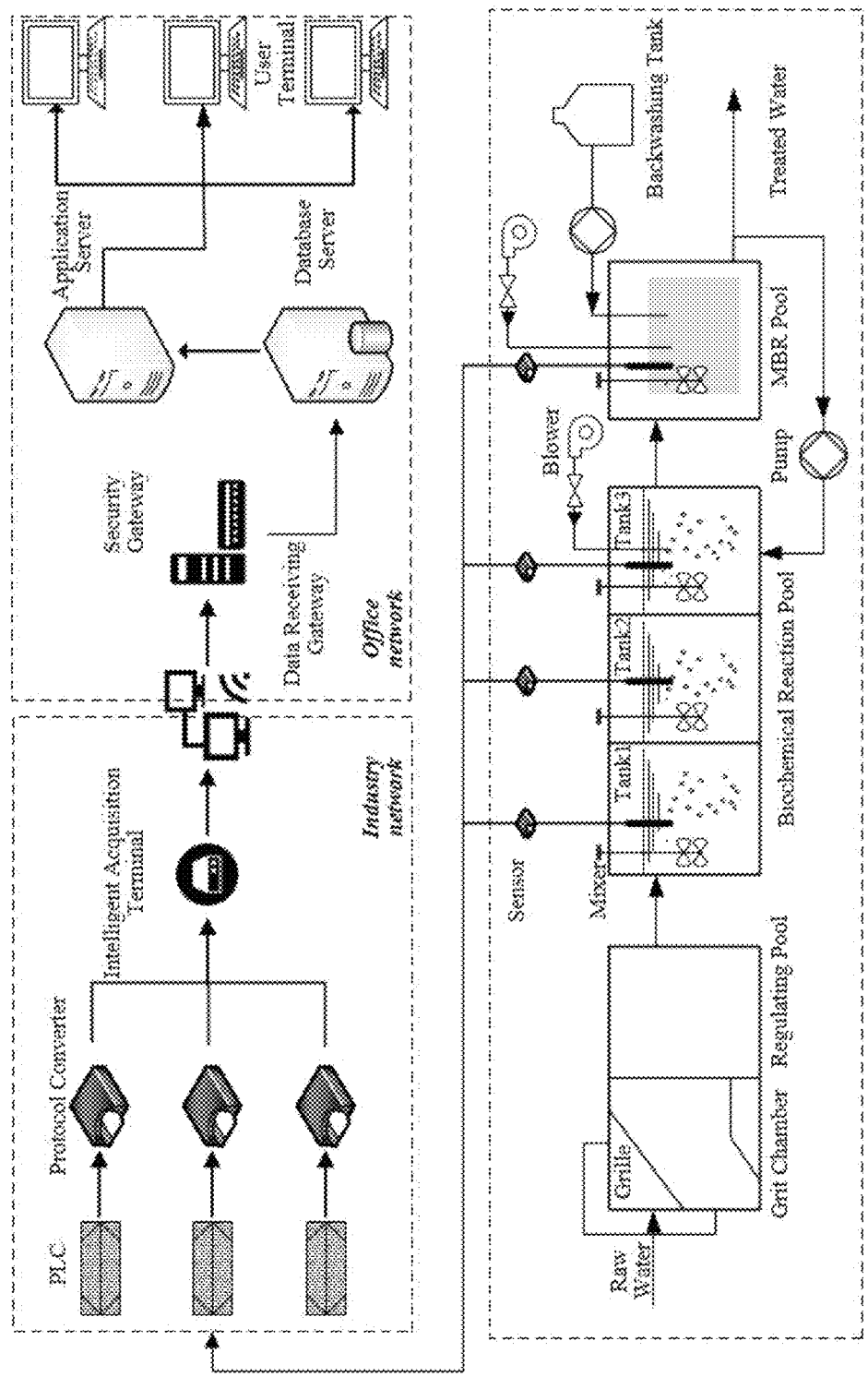
FIG. 2 is the data acquisition hardware platform of the MBR membrane fouling intelligent early warning system.
Figure 3:
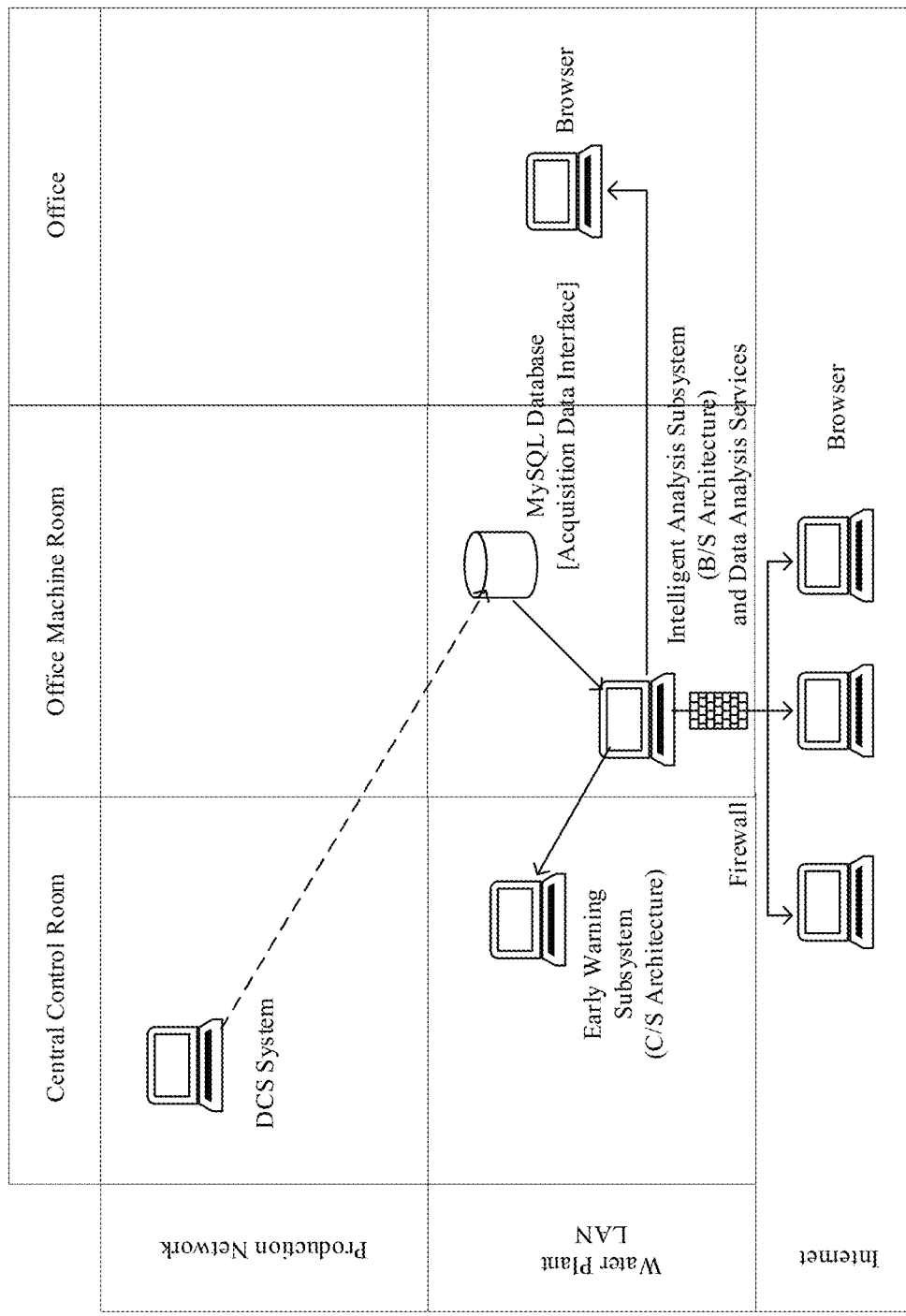
FIG. 3 is a network deployment diagram of the MBR membrane fouling intelligent early warning system.
Figure 4:
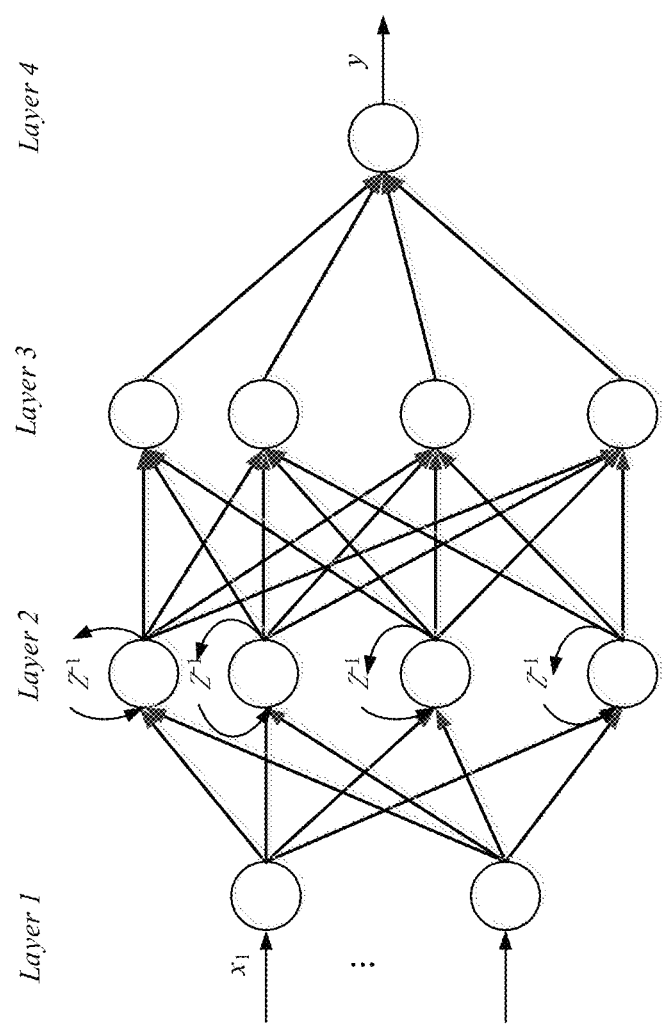
FIG. 4 is structural topology diagram of the recurrent fuzzy neural network.
Figure 5:
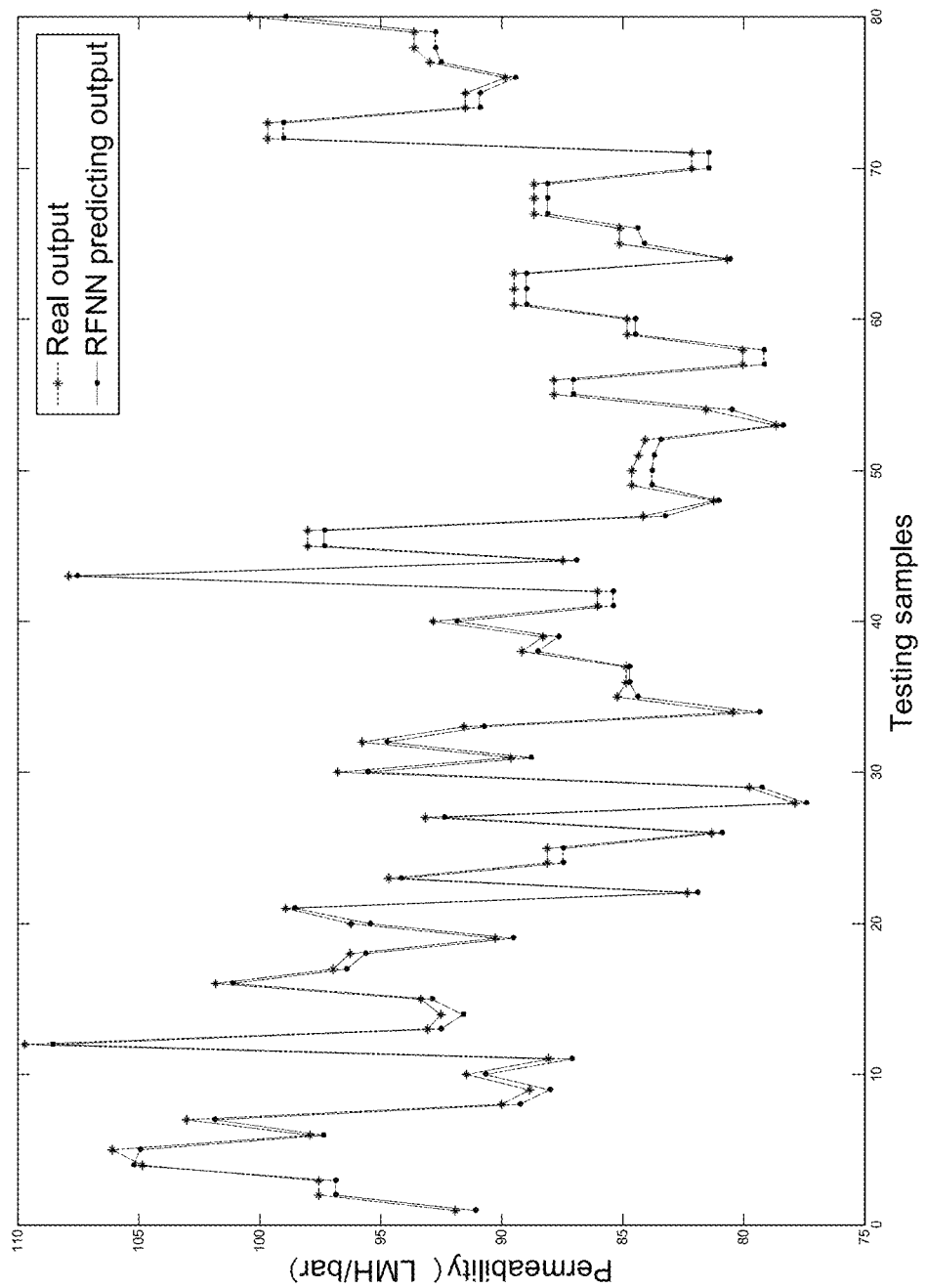
FIG. 5 is the predicted result diagram of the permeability, where the black line with the star is the desired output value of the permeability, and the black line with the point is the predicted value of the recurrent fuzzy neural network.
Figure 6:
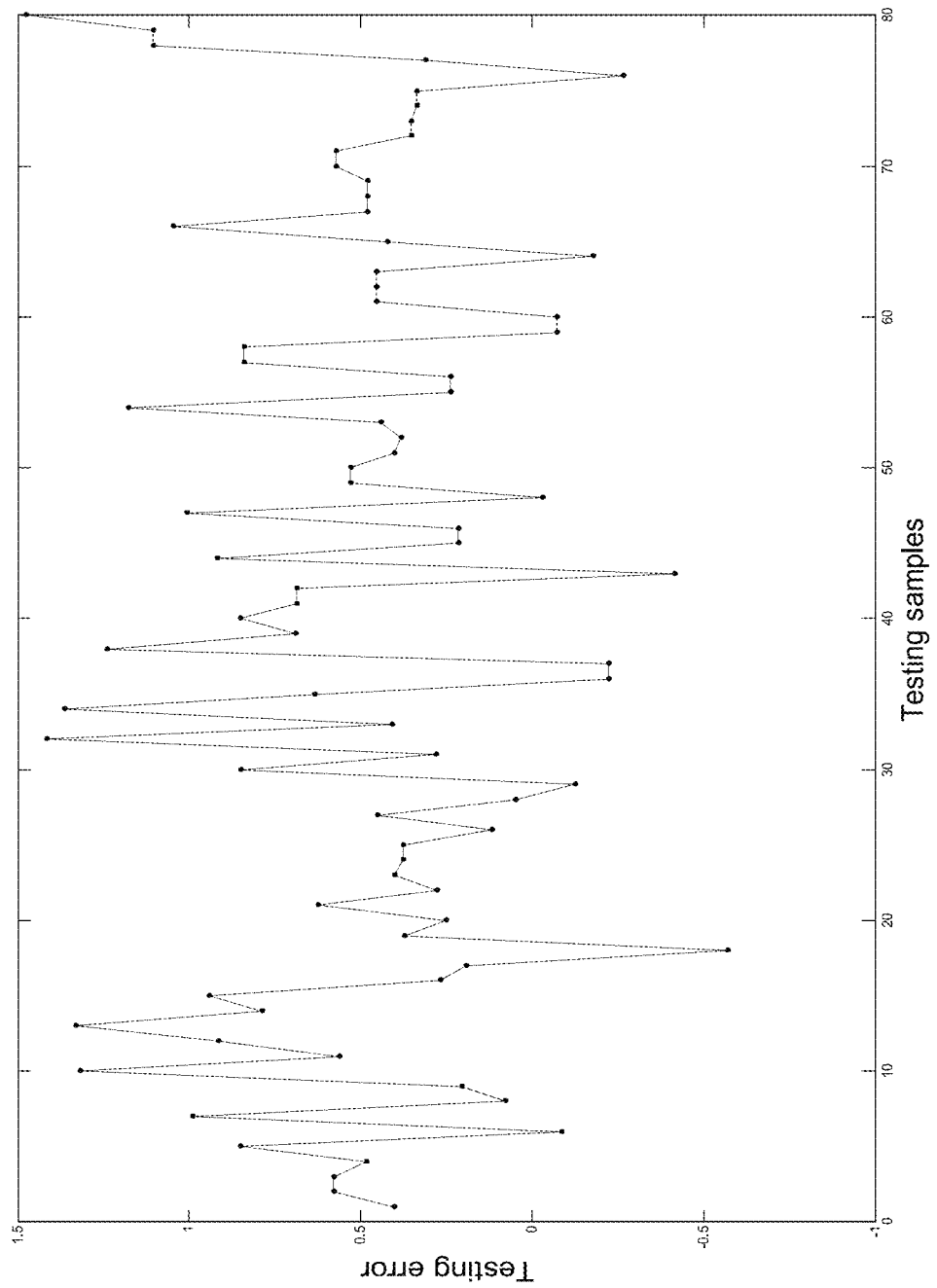
FIG. 6 is the prediction error diagram of the permeability.

DETAILED DESCRIPTION OF THE INVENTION (1) Design of Membrane Pollution Intelligent Early Warning System and Implementation of Software and Hardware Function Integration The hardware platform environment built in the actual wastewater treatment plant is shown in FIG. 2. The running process data is acquired by the acquisition instrument installed at the process site; which is transmitted to the PLC through Modbus communication protocol, and PLC transmits the running process data to the host computer through RS232 communication protocol. The data in the host computer is transmitted to the data processing server through the local area network. The running process data is displayed to the management personnel in wastewater treatment plant through the Web server in the Browser/Server mode, and the water permeability prediction and the membrane fouling early warning result are displayed in the Client/Server mode. The main functions of the developed MBR membrane fouling intelligent early warning system include: ①query of membrane operation parameters, ②online prediction of water permeability, and ③early warning of membrane fouling level.

The invention adopts the component technology in the software industry to package the membrane fouling data preprocessing module, the membrane fouling intelligent prediction module and the membrane fouling intelligent early warning module as functional modules, which enhances the reusability of the model, and compensates for the blank from the intelligent early warning technology of MBR membrane fouling to the human-computer interaction interface in the actual system operation at home and abroad. This invention adopts the .NET platform for software development, facilitates the creation of ActiveX controls, and expands the usable environment of the software. The fieldbus technology is used to establish a full-process system communication network to realize information transmission between modules, Meanwhile, the MBR membrane fouling intelligent early warning system realizes the connection between the central control room and the various data collection points in the field, which constitutes a centralized early warning system. The system is easy to expand, and each part has independent functions, which can add software and hardware modules according to actual predictions and integrate with other systems to achieve stability and reliability of the system and ensure the early warning accuracy of membrane fouling.

(2) Implementation of Membrane Fouling Intelligent Early Warning Method

The invention provides a membrane bioreactor-MBR membrane pollution intelligent early warning method, that the characteristic variable of the MBR membrane water permeability is obtained by feature analysis, the soft-computing model of the MBR membrane water permeability is established by recurrent fuzzy neural network to achieve the intelligent detection of MBR membrane permeability, a comprehensive evaluation model of membrane fouling level is established through the prediction values of membrane permeability combining with other process variables that can be collected by the wastewater treatment plant to realize the judgment of membrane fouling level, which improve the intelligent early warning of membrane fouling in wastewater treatment plant to ensure the normal operation of the wastewater treatment process.

①The input variables are collected by the online measuring instrument installed at the process site. Five variables are acquired which parameter information and collection position are shown in Table 1.

TABLE 1

| Process variable type | | | |
|---|---|---|---|
| Parameter name | Unit | Acquisition position | Acquisition instrument |
| Water Flow | m³/h | Head of MBR pool | ViSolid700IQ |
| Water pressure | kPa | End of MBR pool | SensoLyt700IQ |
| Aeration | m³/h | Gas pump | SensoLyt700IQ |
| Anaerobic zone ORP | mV | End of anaerobic tank | SensoLyt700IQ |
| Aerobic zone nitrate | mg/l | Secondary settling tank of aerobic pool end | NitraLyt700IQ |

②A soft-computing model is established using recurrent fuzzy neural network. The real-time data is collected to train and test the recurrent fuzzy neural network. 80 samples are selected as testing data. The collected data is shown in Table 2.

③Comprehensive evaluation of membrane fouling is established by using the predicted values of water permeability and other relevant acquisition variables (water flow, water pressure, and aeration) to obtain the pollution level of the membrane.

TABLE 2

| Test data of soft-computing model | | | | | |
|---|---|---|---|---|---|
| Number of data sets | Water flow (m³/h) | Water pressure (kPa) | Aeration (m³/h) | ORP in Anaerobic zone (mV) | Nitrate in Aerobic zone (mg/l) |
| 1 | 356.46 | −28.91 | 5222.8 | −164.13 | 5.84 |
| 2 | 352.92 | −29.6 | 7815.39 | −163.77 | 5.85 |
| 3 | 347.29 | −27.86 | 7815.39 | −218.82 | 5.8 |
| 4 | 278.54 | −24.31 | 4629.63 | −223.31 | 5.84 |
| 5 | 334.58 | −27.08 | 4629.63 | −157.19 | 5.93 |
| 6 | 328.54 | −28.04 | 4629.63 | −162.83 | 5.94 |
| 7 | 343.75 | −27.95 | 4629.63 | −167.25 | 5.9 |
| 8 | 343.96 | −27.6 | 6828.7 | −163.48 | 5.96 |
| 9 | 332.5 | −26.91 | 4722.22 | −163.48 | 5.93 |
| 10 | 338.96 | −27.52 | 5740.74 | −154.51 | 5.95 |
| 11 | 334.79 | −27.52 | 5740.74 | −158.56 | 5.95 |
| 12 | 338.75 | −27.52 | 7751.74 | −158.56 | 5.99 |
| 13 | 308.75 | −26.04 | 7751.74 | −142.14 | 5.99 |
| 14 | 319.58 | −26.3 | 4560.19 | −109.01 | 6.06 |
| 15 | 343.75 | −28.3 | 4560.19 | −101.85 | 6.05 |
| 16 | 306.04 | −25.43 | 7167.25 | −86.81 | 6.16 |
| 17 | 296.25 | −24.74 | 7847.22 | −83.84 | 6.18 |

TABLE 2-continued

Test data of soft-computing model

| Number of data sets | Water flow (m³/h) | Water pressure (kPa) | Aeration (m³/h) | ORP in Anaerobic zone (mV) | Nitrate in Aerobic zone (mg/l) |
|---|---|---|---|---|---|
| 18 | 303.96 | −25.17 | 7847.22 | −95.56 | 6.24 |
| 19 | 312.71 | −25.69 | 4649.88 | −66.55 | 6.27 |
| 20 | 310.42 | −25.61 | 5196.76 | −79.28 | 6.31 |
| 21 | 320.62 | −26.13 | 7896.41 | −59.46 | 6.57 |
| 22 | 319.58 | −26.3 | 7896.41 | −50.78 | 6.72 |
| 23 | 311.67 | −26.04 | 4568.87 | −51.36 | 7.47 |
| 24 | 314.79 | −26.13 | 4424.19 | −53.24 | 7.57 |
| 25 | 317.5 | −26.65 | 5185.19 | −51.94 | 7.62 |
| 26 | 319.79 | −26.3 | 5185.19 | −58.88 | 7.76 |
| 27 | 300 | −26.56 | 5185.19 | −47.45 | 7.8 |
| 28 | 312.71 | −25.61 | 4539.93 | −52.52 | 7.95 |
| 29 | 307.5 | −25.61 | 5248.84 | −51 | 8.03 |
| 30 | 308.54 | −26.04 | 4629.63 | −52.23 | 8.2 |
| 31 | 327.92 | −26.91 | 7089.12 | −47.6 | 8.3 |
| 32 | 327.92 | −26.91 | 4577.55 | −53.24 | 8.32 |
| 33 | 329.58 | −26.74 | 4629.63 | −63.08 | 8.77 |
| 34 | 343.75 | −27.78 | 5280.67 | −60.11 | 8.96 |
| 35 | 333.75 | −27.95 | 7638.89 | −55.27 | 9.25 |
| 36 | 355 | −29.69 | 6973.38 | −73.06 | 9.33 |
| 37 | 353.12 | −29.08 | 6973.38 | −64.16 | 9.42 |
| 38 | 354.38 | −28.73 | 6973.38 | −58.09 | 9.46 |
| 39 | 340.83 | −27.52 | 6973.38 | −62.79 | 9.49 |
| 40 | 318.96 | −26.3 | 6973.38 | −55.19 | 9.5 |
| 41 | 336.67 | −27.86 | 6973.38 | −66.26 | 9.52 |
| 42 | 340 | −28.39 | 6973.38 | −56.5 | 9.6 |
| 43 | 330.42 | −27.6 | 6973.38 | −51.36 | 9.76 |
| 44 | 315 | −25.87 | 6973.38 | −49.91 | 9.81 |
| 45 | 331.04 | −27.34 | 6973.38 | −50.93 | 9.87 |
| 46 | 305.21 | −26.3 | 6973.38 | −58.02 | 9.67 |
| 47 | 313.96 | −26.48 | 6973.38 | −57.73 | 9.85 |
| 48 | 303.33 | −25.78 | 6973.38 | −62.28 | 9.96 |
| 49 | 336.25 | −28.39 | 6973.38 | −58.59 | 10.17 |
| 50 | 363.96 | −30.21 | 6973.38 | −54.9 | 10.13 |
| 51 | 299.17 | −25.61 | 6973.38 | −241.17 | 9.74 |
| 52 | 327.5 | −27.43 | 6973.38 | −231.55 | 9.52 |
| 53 | 323.12 | −27 | 5410.88 | −231.77 | 9.52 |
| 54 | 317.92 | −26.74 | 7989 | −243.42 | 9.35 |
| 55 | 317.92 | −26.56 | 7867.48 | −254.99 | 9.29 |
| 56 | 322.92 | −26.91 | 7867.48 | −262.73 | 9.25 |
| 57 | 323.33 | −26.74 | 4256.37 | −252.82 | 9.16 |
| 58 | 327.29 | −27.43 | 4832.18 | −257.6 | 8.68 |
| 59 | 318.96 | −26.22 | 7997.69 | −246.46 | 8.66 |
| 60 | 342.5 | −29.25 | 7798.03 | −283.2 | 8.54 |
| 61 | 345.62 | −29.08 | 4673.03 | −280.31 | 8.6 |
| 62 | 348.12 | −29.6 | 4887.15 | −236.11 | 8.57 |
| 63 | 331.04 | −28.65 | 7960.07 | −112.27 | 8.54 |
| 64 | 339.58 | −28.21 | 7968.75 | −68.58 | 8.55 |
| 65 | 321.88 | −27.17 | 7621.53 | −73.42 | 8.76 |
| 66 | 334.17 | −27.17 | 4641.2 | −37.25 | 9 |
| 67 | 315.42 | −26.48 | 5031.83 | −32.41 | 9.16 |
| 68 | 328.33 | −27.78 | 5031.83 | −241.68 | 9.06 |
| 69 | 394.79 | −31.86 | 8107.64 | −185.84 | 9.51 |
| 71 | 410.21 | −32.81 | 4620.95 | −246.6 | 9.67 |
| 72 | 360.83 | −29.25 | 4664.35 | −121.09 | 9.84 |
| 73 | 347.92 | −28.3 | 4858.22 | −220.49 | 9.82 |
| 74 | 359.58 | −28.82 | 8029.51 | −217.95 | 9.87 |
| 75 | 392.92 | −31.25 | 7873.26 | −238.72 | 9.85 |
| 76 | 355 | −28.82 | 6368.63 | −237.12 | 9.89 |
| 77 | 354.38 | −28.39 | 4265.05 | −226.35 | 9.91 |
| 78 | 355.21 | −29.69 | 4858.22 | −245.52 | 9.9 |
| 79 | 376.04 | −30.47 | 4858.22 | −246.09 | 9.91 |
| 80 | 363.33 | −29.77 | 7696.76 | −240.16 | 9.92 |

What is claimed is:

1. Membrane bioreactor-MBR membrane fouling intelligent early warning method for a wastewater treatment process (WWTP), comprising the following steps:

(1) data acquisition of the wastewater treatment process comprises: collect WWTP data by an acquisition instrument installed on site of the wastewater treatment process, the WWTP data including the following variables: water flow volume, water pressure, influent chemical oxygen demand (COD), pH, influent biological oxygen demand (BOD), effluent total phosphorus (TP), oxidation-reduction potential (ORP), dissolved oxygen (DO), nitrate, aeration volume; the data acquisition of the WWTP further comprises transmitting the acquired WWTP data to a Programmable Logic Controller (PLC) through Modbus communication protocol for pretreatment by the PLC, wherein the PLC transmits pretreated WWTP data to a host computer through RS232 communication protocol for intelligent prediction and early warning of membrane fouling; intelligent prediction result and early warning information of membrane fouling obtained in the host computer is transmitted to a database server through a local area network and displayed on a computer interface through a browser;

(2) the pretreatment of the acquired WWTP data by the PLC comprises: using a partial least squares method to extract five principal component variables, which are the water flow volume, the water pressure, the aeration volume, the ORP and the nitrate; these five principal component variables are used as input variables of a membrane fouling intelligent prediction model, and water permeability is used as output variable of the membrane fouling intelligent prediction model and as one of evaluation indexes of membrane fouling;

(3) the intelligent prediction of membrane fouling via the host computer comprises: establish a soft-computing model to predict the water permeability based on a recurrent fuzzy neural network in the host computer to obtain predicted water permeability, a structure of the recurrent fuzzy neural network contains four layers: an input layer, a membership function layer, a normalized layer and an output layer, the recurrent fuzzy neural network is 5-M-M-1, M is an integer and 2<M<30; connecting weights between the input layer and the membership function layer are assigned 1, an output of the recurrent fuzzy neural network is y(t); prediction method of water permeability based on the recurrent fuzzy neural network is:

$$y(t) = \quad (1)$$

$$f(x(t)) = \sum_{j=1}^{M} w_j(t) \prod_{i=1}^{5} \exp\left[-\frac{[\beta_{ij}(t)x_i(t) + \theta_{ij}(t)O_{ij}^2(t-1) - m_{ij}(t)]^2}{(\sigma_{ij}(t))^2}\right],$$

where $x(t)=[x_1(t), x_2(t), x_3(t), x_4(t), x_5(t)]$ is an output vector at time t, $x_1(t)$ is the value of the water flow volume, $x_2(t)$ is the value of the water pressure, $x_3(t)$ is the value of the aeration volume, $x_4(t)$ is the value of ORP, and $x_5(t)$ is the value of nitrate, f is corresponding relation between y(t) and x(t), $w_j(t)$ is jth weight between the normalized layer and the output layer, $\beta_{ij}(t)=1$ is a weight between ith neuron in the input layer and jth neuron in the membership function layer, $m_{ij}(t)$ is ith element of center values of the jth neuron in the membership function layer and $\sigma_{ij}(t)$ is ith element of width values of the jth neuron in the membership function layer, $\theta_{ij}(t)$ is feedback weight in the membership function layer, O2 ij(t−1) is feedback value of the membership function layer, where $$O_{ij}^2(t-1)=\exp\{-[\beta_{ij}(t-1)x_i(t-1)+\theta_{ij}(t-1)O_{ij}^2(t-2)-m_{ij}(t-1)/(\sigma_{ij}(t-1)^2\}, \quad (2)$$

where $\beta_{ij}(t-1)=1$ is the weight between the ith neuron in the input layer and the jth neuron in the membership function layer, $m_{ij}(t-1)$ is the ith element of the center values of the jth neuron in the membership function layer and $\sigma_{ij}(t-1)$ is the ith element of the width values of the jth neuron in the membership function layer, $\theta_{ij}(t-1)$ is the feedback weight in the membership function layer at time, O2 ij(t−2) is the feedback value of the membership function layer; the error of the recurrent fuzzy neural network is:

$$E(t) = \frac{1}{N}\sum_{i=1}^{N}(y_d(t)-y(t))^2, \quad (3)$$

where N is the number of samples, $y_d(t)$ is the output of the recurrent fuzzy neural network at time t, y(t) is the actual output at time t, the recurrent fuzzy neural network model is trained in following steps:

1) based on the recurrent fuzzy neural network, the initial number of neurons in the membership function layer and the normalized layer is M, M is a positive integer and 2<M<30; an input of the recurrent fuzzy neural network is x(1), x(2), ..., x(t), ..., x(N), correspondingly, an output of the recurrent fuzzy neural network is $y_d(1), y_d(2), ..., y_d(t), ..., y_d(N)$, the number of training samples is N, expected error value is set to $E_d$, $E_d \in (0, 0.01)$, an assignment interval of each variable in initial center values $m_j(1)$ is [−2, 2], $m_j(1)=(m_{1j}(1), m_{2j}(1), ..., m_{ij}(1))$, $m_{ij}(1)$ is the initial value of the ith element of the center values of the jth neuron in the membership function layer, an assignment interval of each variable in the initial width values of $\sigma_j(1)$ is [0,1], $\sigma_j(1)=(\sigma1_j(1), \sigma2_j(1), ..., \sigma_{ij}(1))$, $\sigma_{ij}(1)$ is the initial value of the ith element of width values of the jth neuron in the membership function layer, $\theta_{ij}(t-1)$ is the feedback weight in the membership function layer at time t−1, an assignment interval of an initial feedback connection weight $\theta_{ij}(1)$ is [0, 1], j=1, 2, ..., M; an assignment interval of each variable in the initial weights w(1) is [−1, 1], $w(1)=(w_1(1), w_2(1), ..., w_j(1))$, $w_j(1)$ is connection weight between the jth neuron of normalized layer and the output layer at the initial time;

2) set a learning step s=1;

3) calculate the output y(t) of the recurrent fuzzy neural network according to Eq. (1), exploiting gradient descent algorithm:

$$m_{ij}(t+1) = m_{ij}(t) - \eta_m \frac{1}{\sigma_{ij}^2(t)}(y_d(t)-y(t))w_j(t)O_{ij}(t)[O_{ij}(t)-m_{ij}(t)], \quad (4)$$

$$\sigma_{ij}(t+1) = \sigma_{ij}(t) - \eta_\sigma \frac{1}{\sigma_{ij}^3(t)}(y_d(t)-y(t))w_j(t)O_{ij}(t)\|O_{ij}(t)-m_{ij}(t)\|^2, \quad (5)$$

$$\theta_{ij}(t+1) = \theta_{ij}(t) - \eta_\theta(y_d(t)-y(t))w_j(t)O_{ij}(t)y(t-1), \quad (6)$$

$$w_j(t+1) = w_j(t) - \eta_w(y_d(t)-y(t))O_{ij}(t), \quad (7)$$

where $\eta_m$ is a learning rate of the center $m_{ij}$, $\eta_m \in (0, 0.01]$, $\eta\sigma$ is a learning rate of the width $\sigma_j$, $\eta\sigma \in (0, 0.01]$, $\eta_\theta$ is a learning rate of the feedback connection weight $\theta_{ij}$, $\eta_\theta \in (0, 0.02]$, $\eta_w$ is a learning rate of the connection weight $w_j$, $\eta_w \in (0, 0.01]$, $m_{ij}(t+1)$ is a ith element of the center values of the jth neuron in the membership function layer at time t+1 and $\sigma_{ij}(t+1)$ is the ith element of width values of the jth neuron in the membership function layer at time t+1, $\theta_{ij}(t+1)$ is the feedback weight in the membership function layer at time t+1, $w_j(t+1)$ is the connection weight between the jth neuron of normalized layer and the output layer at time t+1;

4) calculate performance of the recurrent fuzzy neural network according to Eq. (3), if $E(t) \geq E_d$, go back to step 3) in training the recurrent fuzzy neural network model; if $E(t) < E_d$, stop the training process;

(4) the intelligent early warning of membrane fouling by the host computer comprises: establishing a comprehensive evaluation model of membrane fouling level based on the predicted water permeability and the five principal component variables, which is specifically as follows:

1) determine a warning evaluation index of membrane fouling, set $U(t)=\{u_1(t), u_2(t), u_3(t), y(t)\}$ as an evaluation indicator vector, $u_1(t)$, $u_2(t)$, and $u_3(t)$ represent the values of the water flow volume, the water pressure and the aeration volume, y(t) is the predicted water permeability;

2) establish a membership functions and fuzzy comprehensive assessment matrix, the membership functions reflect relationships between measured values of the five principal component variables and fouling levels, a membership of the evaluation factor is obtained by bringing the measured values into the membership functions, a membership degree matrix R(t) is represented as $$R(t) = (r_{ij}(t))_{4\times 4} = \begin{pmatrix} r_{11}(t) & r_{12}(t) & r_{13}(t) & r_{14}(t) \\ r_{21}(t) & r_{22}(t) & r_{23}(t) & r_{24}(t) \\ r_{31}(t) & r_{32}(t) & r_{33}(t) & r_{34}(t) \\ r_{41}(t) & r_{42}(t) & r_{43}(t) & r_{44}(t) \end{pmatrix}, \quad (8)$$

where $r_{ij}(t)$ (i=1, 2, ..., 4; j=1, 2, ..., 4) indicates the membership degree of ith index and corresponding jth fouling level; the membership degrees of water flow volume at different risk rank fouling level are $$r_{11}(t) = \begin{cases} 1, & u_1(t) \leq 200 \\ (300-u_1(t))/100, & 200 < u_1(t) \leq 300 \\ 0, & u_1(t) > 300 \end{cases} \quad (9)$$

$$r_{12}(t) = \begin{cases} 0, & u_1(t) \leq 200, u_1(t) > 460 \\ (u_1(t)-200)/100, & 200 < u_1(t) \leq 300 \\ (460-u_1(t))/160, & 300 < u_1(t) \leq 460 \end{cases} \quad (10)$$

$$r_{13}(t) = \begin{cases} 0, & u_1(t) \leq 300, u_1(t) > 1000 \\ (u_1(t)-300)/160, & 300 < u_1(t) \leq 460 \\ (1000-u_1(t))/540, & 460 < u_1(t) \leq 1000 \end{cases} \quad (11)$$

$$r_{14}(t) = \begin{cases} 0, & u_1(t) < 460 \\ (u_1(t)-460)/540, & 460 \leq u_1(t) \leq 1000 \\ 1, & u_1(t) > 1000 \end{cases} \quad (12)$$

the membership degrees of water pressure at different fouling level are $$r_{21}(t) = \begin{cases} 1, & u_2(t) \leq 5 \\ (10-u_2(t))/5, & 5 < u_2(t) \leq 10 \\ 0, & u_2(t) > 10 \end{cases} \quad (13)$$

-continued $$r_{22}(t) = \begin{cases} 0, u_2(t) \le 5, u_2(t) > 15 \\ (u_2(t)-5)/5, 5 < u_2(t) \le 10 \\ (15-u_2(t))/5, 10 < u_2(t) \le 15 \end{cases} \quad (14)$$

$$r_{23}(t) = \begin{cases} 0, u_2(t) \le 10, u_2(t) > 20 \\ (u_2(t)-10)/5, 10 < u_2(t) \le 15 \\ (20-u_2(t))/5, 15 < u_2(t) \le 20 \end{cases} \quad (15)$$

$$r_{24}(t) = \begin{cases} 0, u_2(t) < 15 \\ (u_2(t)-15)/5, 15 \le u_2(t) \le 20 \\ 1, u_2(t) > 20 \end{cases} \quad (16)$$

the membership degrees of aeration volume at different fouling level are $$r_{31}(t) = \begin{cases} 1, u_3(t) \le 15 \\ (20-u_3(t))/5, 15 < u_3(t) \le 20 \\ 0, u_3(t) > 20 \end{cases} \quad (17)$$

$$r_{32}(t) = \begin{cases} 0, u_3(t) \le 15, u_3(t) > 30 \\ (u_3(t)-15)/5, 15 < u_3(t) \le 20 \\ (30-u_3(t))/10, 20 < u_3(t) \le 30 \end{cases} \quad (18)$$

$$r_{33}(t) = \begin{cases} 0, u_3(t) \le 20, u_3(t) > 50 \\ (u_3(t)-20)/10, 20 < u_3(t) \le 30 \\ (50-u_3(t))/20, 30 < u_3(t) \le 50 \end{cases} \quad (19)$$

$$r_{34}(t) = \begin{cases} 0, u_3(t) < 30 \\ (u_3(t)-30)/20, 30 \le u_3(t) \le 50 \\ 1, u_3(t) > 50 \end{cases} \quad (20)$$

the membership degrees of water permeability at different risk rank fouling level are $$r_{41}(t) = \begin{cases} 1, y(t) \le 30 \\ (60-y(t))/30, 30 < y(t) \le 60 \\ 0, y(t) > 60 \end{cases} \quad (21)$$

$$r_{42}(t) = \begin{cases} 0, y(t) \le 30, y(t) > 80 \\ (y(t)-30)/30, 30 < y(t) \le 60 \\ (80-y(t))/20, 60 < y(t) \le 80 \end{cases} \quad (22)$$

$$r_{43}(t) = \begin{cases} 0, y(t) \le 60, y(t) > 200 \\ (y(t)-60)/20, 60 < y(t) \le 80 \\ (80-y(t))/120, 80 < y(t) \le 200 \end{cases} \quad (23)$$

$$r_{44}(t) = \begin{cases} 0, y(t) < 80 \\ (y(t)-80)/120, 80 \le y(t) \le 200 \\ 1, y(t) > 200 \end{cases} \quad (24)$$

3) determine current fouling level, $B(t)=[b_1(t), b_2(t), b_3(t), b_4(t)]$ is a possibility vector of matrix $R(t)$, $\eta(t)=[n_1(t), n_2(t), n_3(t), n_4(t)]$ is a weight vector of matrix $R(t)$; the relation between $b_j(t)$ and $\eta_j(t)$ is $$b_j(t) = r_{1j}(t)\eta_1(t) + r_{2j}(t)\eta_2(t) + r_{3j}(t)\eta_3(t) + r_{4j}(t)\eta_4(t), \quad (25)$$

$$B(t) = \lambda(t)\eta(t), \quad (26)$$

where $b_j(t)$, $j=1,2,3,4$, since $b_j(t)$ reflects the possibility of the jth fouling level, $B(t)$ reflects the contribution degree of different fouling level and is expressed as:

$$B(t) = \lambda(t)\eta(t), \quad (27)$$

$$\lambda_{max}(t) = \max \lambda(t), \quad (28)$$

where $\lambda(t)$ is a ratio coefficient vector between $B(t)$ and $\eta(t)$; a maximum ratio coefficient is given as $\lambda_{max}(t)$, which is the maximum eigenvalue of $R(t)$; according to matrix theory, the column ordinal of largest eigenvalue is considered as the current fouling level;

if the current fouling level is higher than a preset-point, an early warning is issued to realize real-time cleaning or replacement of a membrane module of the WWTP.

\* \* \* \* \*